(12) United States Patent
Canzler et al.

(10) Patent No.: US 7,689,010 B2
(45) Date of Patent: Mar. 30, 2010

(54) FACIAL FEATURE ANALYSIS SYSTEM

(75) Inventors: Ulrich Canzler, Aachen (DE); Karl Friedrich Kraiss, Aachen (DE)

(73) Assignee: Invacare International Sarl, Gland (CH)

( * ) Notice: Subject to any disclaimer, the term of this patent is extended or adjusted under 35 U.S.C. 154(b) by 900 days.

(21) Appl. No.: 11/271,309

(22) Filed: Nov. 10, 2005

(65) Prior Publication Data

US 2006/0153430 A1 Jul. 13, 2006

Related U.S. Application Data

(60) Provisional application No. 60/725,540, filed on Oct. 11, 2005.

(30) Foreign Application Priority Data

Dec. 3, 2004 (DE) ........................ 10 2004 059482

(51) Int. Cl.
G06K 9/00 (2006.01)
G06K 9/46 (2006.01)
(52) U.S. Cl. ...................................... 382/118; 382/190
(58) Field of Classification Search ................. 382/115, 382/118, 100, 190, 195
See application file for complete search history.

(56) References Cited

U.S. PATENT DOCUMENTS

| | | | |
|---|---|---|---|
| 7,058,209 B2* | 6/2006 | Chen et al. ................... | 382/117 |
| 2003/0058111 A1* | 3/2003 | Lee et al. .................. | 340/573.1 |
| 2004/0210159 A1* | 10/2004 | Kibar .......................... | 600/558 |
| 2005/0201595 A1* | 9/2005 | Kamei ........................ | 382/118 |
| 2007/0183633 A1* | 8/2007 | Hoffmann ................... | 382/116 |

OTHER PUBLICATIONS

Cootes, et al., Active Appearance Models, IEEE Transactions on Pattern Analysis and Machine Intelligence, vol. 23, Issue 6, pp. 681-685, 2001.
Stegman, Active Appearance Models: Theory, extensions and cases, Master's Thesis, Informatics and Mathematical Modeling, Technical University of Denmark, DTU, Richard Peterson Plads, Building 321, DK-2800 Kgs. Lyngby, Aug. 2000.
Matthews, et al., A comparison of active shape model and scale decomposition based features for visual speech recognition, Computer Vision—ECCV'98, 5th European Conference on Computer Vision, Freiburg, Germany, 1998, Proceedings, ser. Lecture Notes in Computer Science, H. Burkhardt and B. Neumann, Eds., vol. 2, Springer, Jun. 1998, pp. 514-528.

(Continued)

*Primary Examiner*—Yon Couso
(74) *Attorney, Agent, or Firm*—Calfee, Halter & Griswold LLP

(57) ABSTRACT

A facial feature analysis system for command applications for users with physical disabilities, like impaired users of wheelchairs, patient beds or other appliances is provided. The disclosed system includes a virtual filter bank and a virtual discriminator. The virtual filter bank comprises a feature localization main module having an ancillary data bank which supplies a special signal Sg for control functions. The system calculates face localization based on parameters of a holistic face-model, calculates feature localization based on parameters of an adaptive face graph, calculates feature extraction using stored feature values corresponding to selected validation and provides output signals using a signal delivery main module controlled by static and dynamic classification. The virtual discriminator bank calculates a user adapted allocation based on a face feature of the user and provides a periphery allocation for at least one command modus, and for calculating execution signals for said manipulators.

21 Claims, 6 Drawing Sheets

OTHER PUBLICATIONS

Slabaugh, et al., A survey of methods for volumetric scene reconstruction from photographs, Volume Graphics, Jun. 2001.

Moya, Segmentation of color images for interactive 3d object retrieval, Ph.D. dissertation, RWTH Aachen University, 2004.

Benutzeradaptive videobasierte Erfassung der Mimik als Interface für motorisch eingeschränkte Personen Canzler U., Minklai M. (2004) In: Tolxdorf, T., J. Braun, et al (Eds.): Proceedings des Workshops, Volume Informatik aktuell GI, pp. 20-24, 29.-30. März, Berlin, Springer, ISBN 3-540-21059-8.

Canzler and Wegener, Person-adaptive Facial Feature Analysis, 8th International Student Conference on Electrical Engineering POSTER 2004, vol. CD, Kapitel Papers-Section IC, pp. IC62, The Faculty of Electrical Engineering, Czech Technical University in Prague (Eds.), May 2004.

Canzler and Kraiss, Person-Adaptive Facial Feature Analysis for an Advanced Wheelchair User-Interface, Conference on Mechatronics & Robotics 2004, vol. Part III, pp. 871-876, Aachen, Sascha Eysoldt Verlag, Paul Drews (Eds.), Sep. 2004.

Bley, Rous, Canzler, and Kraiss, Supervised Navigation and Manipulation for Impaired Wheelchair Users, Proceedings of the IEEE International Conference on Systems, Man and Cybernetics. Impacts of Emerging Cybernetics and Human-Machine Systems, pp. 2790-2796, The Hague, IEEE Systems, Man & Cybernetics Society, Thissen, Wil / Wierings, Peter / Pantic, Maia / Ludema, Marcel (Eds.), Oct. 2004.

Manual and Facial Features Combination for Videobased Sign Language Recognition Canzler U., Ersayar T. (2003) In: 7th International Student Conference on Electrical Engineering POSTER 2003. Book of Extended Abstracts, pp. IC8, May 22, 2003, Prague, Faculty of Electrical Engineering, Czech Technical University.

An Information Terminal using Vision Based Sign Language Recognition Akyol S., Canzler U. (2002) In: Büker, U. / H.-J. Eikerling / W. Müller (Eds.): ITEA Workshop on Virtual Home Environments, VHE Middleware Consortium, vol. C-LAB Publication, Bd. 12, pp. 61-68, Feb. 20-21, Paderborn, Shaker, ISBN 3-8265-9884-9.

Facial Feature Extraction for Videobased Sign Language Recognition Canzler U., Dziurzyk T. (2002) In: 6th International Student Conference on Electrical Engineering POSTER 2002. Book of Extended Abstracts., pp. IC10, May 23, 2002, Prague, Faculty of Electrical Engineering, Czech Technical University.

Extraction of Non Manual Features for Videobased Sign Language Recognition Canzler U., Dziurzyk T. (2002) In: The University of Tokyo, Institute of Industrial Science (Eds.): Proceedings of IAPR Workshop on Machine Vision Applications, pp. 318-321, Dec. 11-13, Nara-ken New Public Hall, Nara, Japan, ISBN 4-901122-02-9.

Gesture Control for Use in Automobiles Akyol S., Canzler U., Bengler K., Hahn W. (2000) In: Proceedings of the IAPR MVA 2000 Workshop on Machine Vision Applications, pp. 349-352, Nov. 28-30, Tokyo, ISBN 4-901122-00-2.

LTI Bi-Annual Report 2001/2002, Chair of Technical Computer Science, RWTH Aachen, Germany, Jan. 2003, pp. 1-3 and 27-32.

Automatische Erfassung und Analyse der menschlichen Mimik Canzler U. (2001) In: Handels H., Horsch A. u.a. (Eds.): Informatik aktuell. Proceedings des Workshops Bildverarbeitung für die Medizin 2001. Algorithmen, Systeme, Anwendungen., pp. 382-386, 4.-6. März, Lübeck, Springer, ISBN 3-540-41690-0.

Gestengesteuerter Nachrichtenspeicher im Kraftfahrzeug Akyol S., Canzler U., Bengler K., Hahn W. (2000) In: K.-P. Gärtner (Eds.): 42. Fachausschuβsitzung Anthropotechnik, vol. 2000-02, pp. 319-328, Oct. 24-25, München, Deutsche Gesellschaft für Luft- und Raumfahrt, ISBN 3-932182-13-8.

Gestensteuerung für Fahrzeugbordsysteme Akyol S., Canzler U., Bengler K., Hahn W. (2000) In: Sommer, G., Krüger, N., Perwass, Ch. (Eds.): Informatik aktuell. Mustererkennung 2000. 22. DAGM Symposium, pp. 139-146, Sep. 13-15, Kiel, Springer, ISBN 3-540-67886-7.

Office Action from U.S. Appl. No. 11/272,156 dated Nov. 17, 2008.

\* cited by examiner

FACIAL FEATURE ANALYSIS SYSTEM

This application claims priority to, and benefits associated with, German Pat. App. Ser. No. 10 2004 059 482.1, filed Dec. 3, 2004, the contents of which are fully incorporated herein by reference. This application also claims priority to, and benefits associated with, U.S. Provisional Pat. App. Ser. No. 60/725,540, filed Oct. 11, 2005, the contents of which are fully incorporated herein by reference.

BACKGROUND

1. Technical Field

The invention generally relates to the field of person-adaptive facial feature analysis for all uses, specially in real-time. However, claims of the present invention are limited to uses related to facial feature analysis systems for command applications for users with physical disabilities, e.g. the control of mobile wheelchairs for users with physical disabilities, including supervised manipulation and navigation for impaired users of wheelchairs, patient beds or other appliances.

2. Description of the Prior Art

Generally, conventional prior art systems for this purpose are computer-controlled robotic systems based on infrared and ultrasonic sensors or using voice recognition to issue simple steering commands allowing a handicapped user to realize some simple manipulation tasks. One problem with the prior art systems is that they do not have any kind of navigational autonomy. Furthermore, such systems require manual training steps.

SUMMARY

Hence it is a general object of the invention to provide a facial feature analysis system that avoids these disadvantages by providing a reliable, safe and simple-to-use system for applications requiring a high degree of autonomy. Another feature of the present invention is the capability to automatically operate training steps for facial analysis.

BRIEF DESCRIPTION OF THE DRAWINGS

A more complete understanding of the present invention may be delivered by reference to the detailed description and the claims when considered in connection with the accompanying drawings in which like reference numbers represent similar parts, and wherein:

DESCRIPTION OF THE PREFERRED EMBODIMENT

In one embodiment, the present invention provides, among other things, a facial feature analysis system which automatically analyzes the facial expression of a user by computer vision in real time, and which may be used in a variety of applications. Mimic recognition of the user enables the system to select options on the graphical interface without intervention of a person. Mimic recognition used herein means recognition of certain user behaviour facial features, such as movement and/or positioning of the head, eyes, eyebrows, eyelids, nose, mouth, and/or lips. Each recognizable facial feature, for example, may be referred to as a mimic.

The various embodiments of a facial feature analysis system described herein, for example, may incorporate one or more elements, one or more functions, and/or any suitable combination of elements and/or functions disclosed in the following publications: 1) Canzler and Wegener, Person-adaptive Facial Feature Analysis, 8th International Student Conference on Electrical Engineering POSTER 2004, Volume CD, Kapitel Papers-Section IC, pp. IC62, The Faculty of Electrical Engineering, Czech Technical University in Prague (Eds.), 2) Canzler and Kraiss, Person-Adaptive Facial Feature Analysis for an Advanced Wheelchair User-interface, Conference on Mechatronics & Robotics 2004, Volume Part III, pp. 871-876, Aachen, Sascha Eysoldt Verlag, Paul Drews (Eds.), 3) Bley, Rous, Canzler, and Kraiss, Supervised Navigation and Manipulation for Impaired Wheelchair Users, Proceedings of the IEEE International Conference on Systems, Man and Cybernetics. Impacts of Emerging Cybernetics and Human-Machine Systems, pp. 2790-2796, The Hague, IEEE Systems, Man & Cybernetics Society, Thissen, Wil/Wierings, Peter/Pantic, Maja/Ludema, Marcel (Eds.). The contents of each of the three publications identified above in this paragraph are fully incorporated herein by reference.

The various embodiments of a facial feature analysis system described herein may also incorporate one or more elements, one or more functions, and/or any suitable combination of elements and/or functions disclosed in a Ph.D thesis paper by Ulrich Canzler entitled "Nicht-intrusive Mimikanalyse" and published in German, the contents of which are fully incorporated herein by reference. The Canzler Ph.D thesis paper is in conjunction with RWTH Aachen, Technical Computer Science (LTI).

Figure 1:
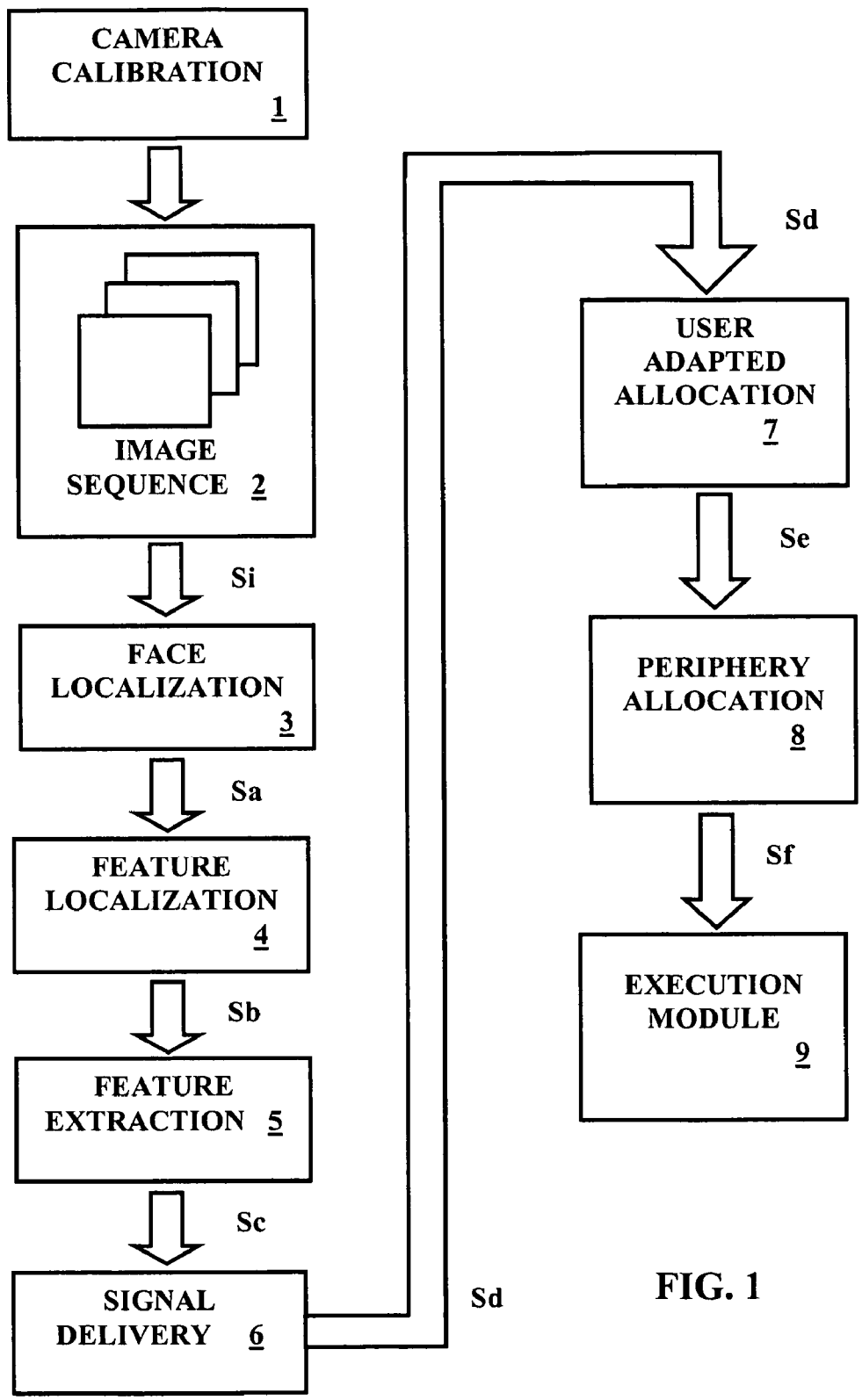
FIG. 1 depicts an exemplary embodiment of a facial feature analysis system according to the invention.

The exemplary embodiment of a facial feature analysis system according to FIG. 1 comprises a camera-calibration process 1 for an image sequence 2 obtained by at least one camera and giving image sequence (e.g., Signal(s) Si), a face localization main module 3 for the tracking and localization of the face of a user, an adaptive feature localization main module 4 for the localization of special facial features, a feature extraction main module 5 for the extraction of a desired feature and a signal delivery main module 6 for a useful signal sequence Sd resulting from said image-sequence through said main modules 3, 4, 5 and 6. The system according to FIG. 1 also comprises a series arrangement of a user adapted allocation main module 7 connected to said signal delivery module 6, a periphery allocation main module 8 and an execution module 9. In FIG. 1 the output signals of the main modules 3, 4, 5, 6, 7 and 8 are labeled Sa, Sb, Sc, Sd, Se and Sf, respectively. The camera may be of monocular type or a stereo-camera.

Figure 2:
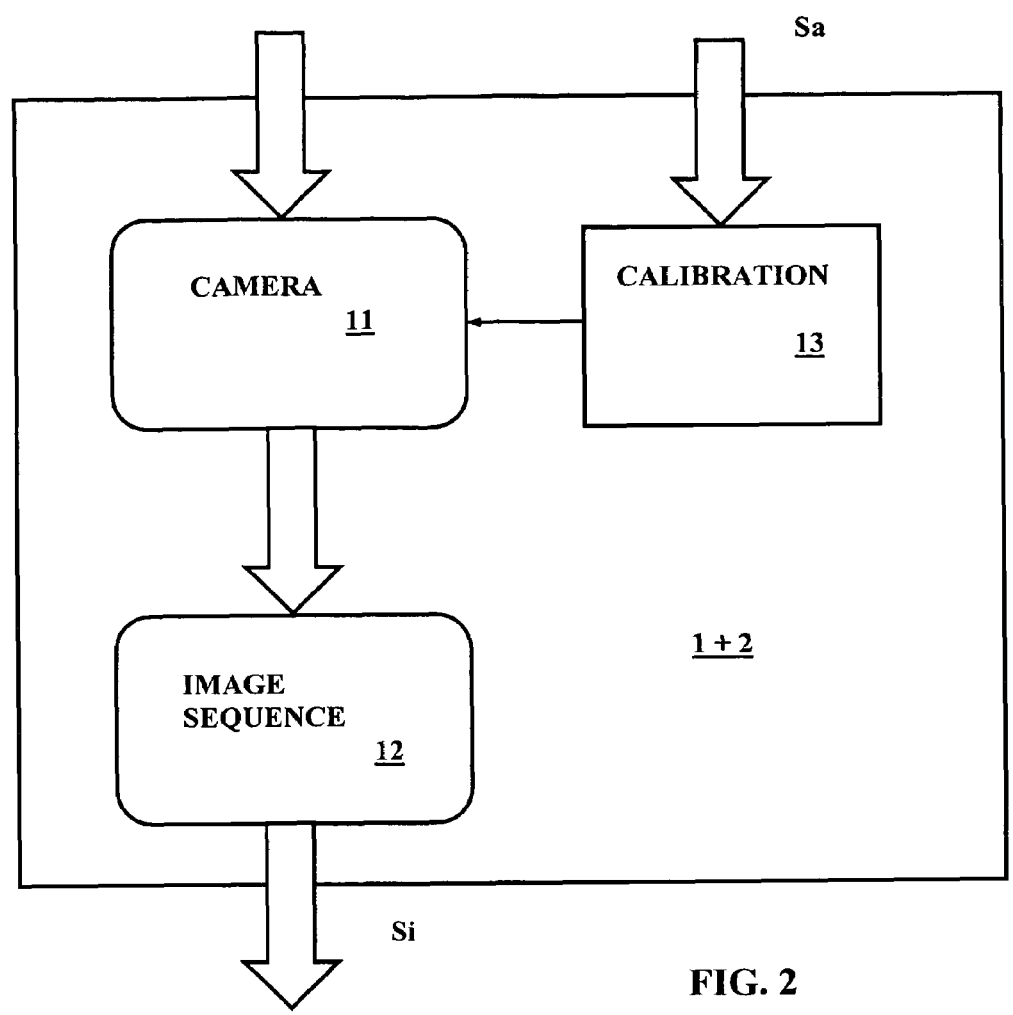
FIG. 2 shows an exemplary embodiment of a camera calibration and the image sequence main module.

The exemplary embodiment of a camera calibration and the image sequence main module of FIG. 2 comprises a camera 11 connected to image sequence means 12 and calibration process 13.

Figure 3:
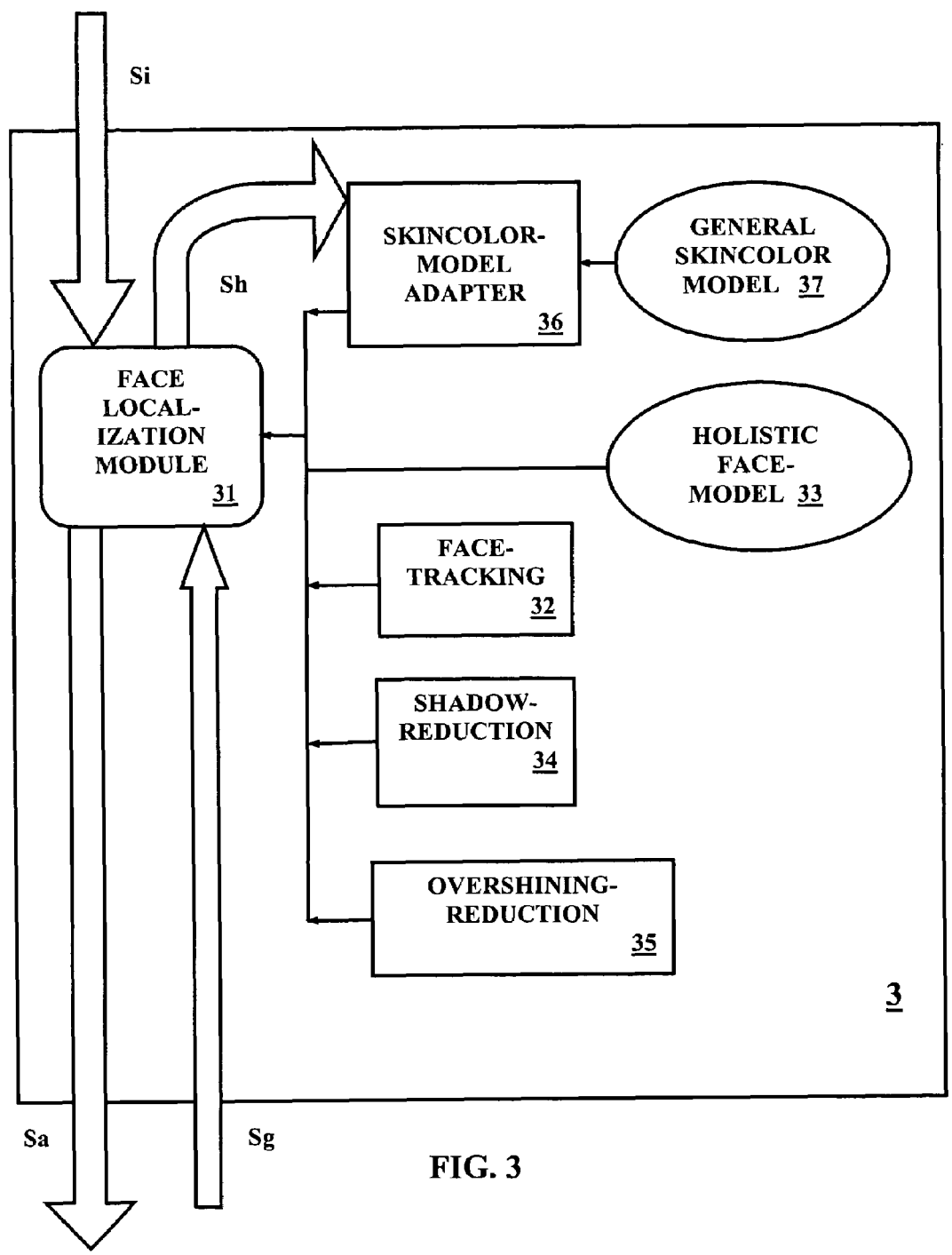
FIG. 3 shows an exemplary embodiment of a face localization main module of said system.

FIG. 3 depicts in more detail the elements of an exemplary embodiment of the face-localization main module 3 (FIG. 1) which substantially includes the sub-tasks corresponding to a face localization module 31 controlled by a face-tracking 32 and a holistic face-model 33, wherein other sub-tasks like that of a shadow-reduction 34, an over-shining-reduction 35 and an adaptive skin-color-adapter 36 in accordance with a general skin-color-model 37 may be accomplished. Preferably, the module 31 receives also a signal Sg from an ancillary data bank 43 (FIG. 4), and an output signal Sh of said module 31 is fed to adapter 36.

In the drawings the arrows between the different black-boxes are depicted indicating the main signal flow direction. However, generally signals may flow in both senses.

Figure 4:
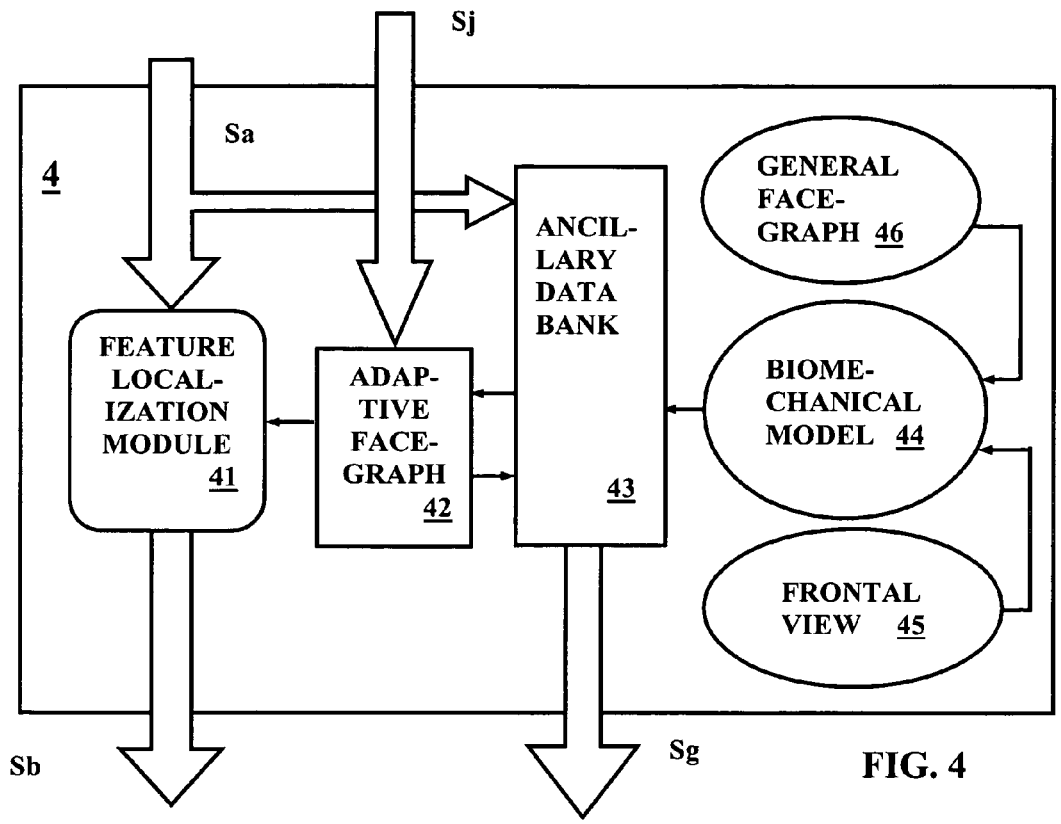
FIG. 4 shows an exemplary embodiment of a feature localization main module.

Referring to FIG. 4, an exemplary embodiment of the feature localization main module 4 (FIG. 1) includes the interaction of the sub-tasks of a feature-localization-module 41 and an adaptive face-graph 42 controlled by parameters delivered through an ancillary data bank 43 according to a suitable 3-dimensional bio-mechanical model 44 delivered in dependence of a frontal view 45 and a general face-graph 46. An output of this ancillary data bank 43 delivers a signal Sg for different purposes as mentioned in connection with FIG. 3 and also shown in FIGS. 5 and 6. In FIGS. 3 and 4 the elements 32-35, 37 and 44-46 may be programmed or customized for a given application of the system.

Figure 5:
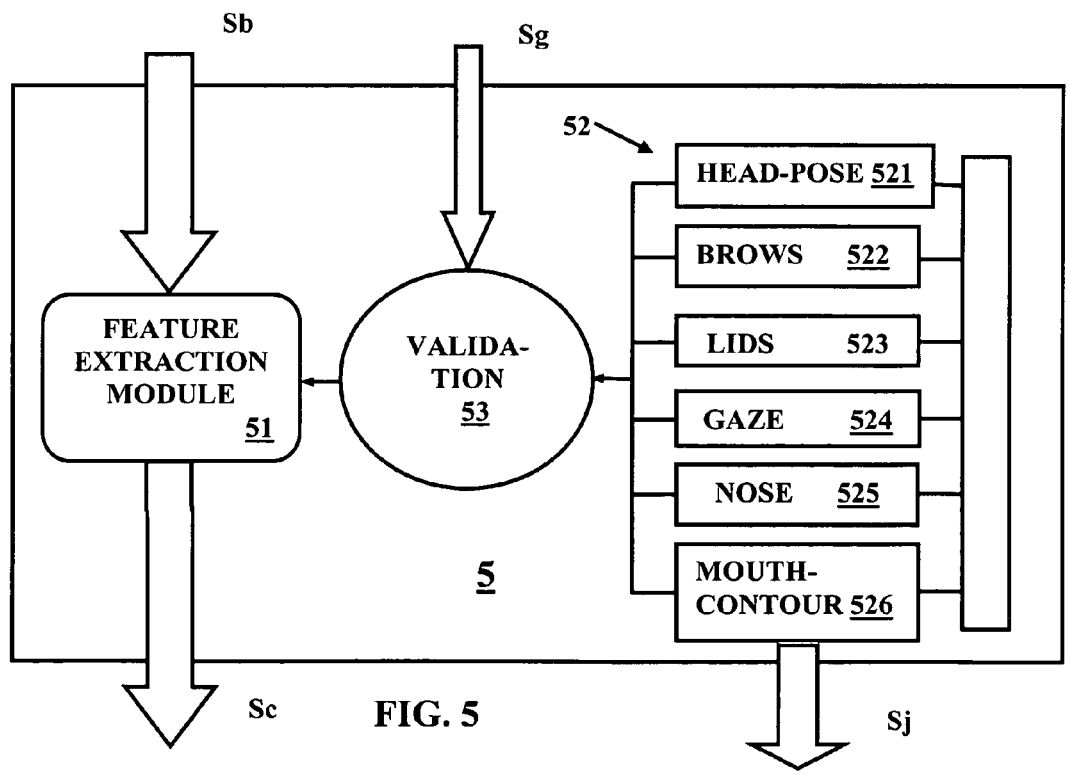
FIG. 5 shows an exemplary embodiment of a feature extraction main module.

According to FIG. 5, the task of an exemplary embodiment of the feature extraction main module 5 (FIG. 1) corresponds to that of a feature extraction module improved by facultative sub-tasks 521, 522, 523, 524, 525 and 526 relative to the head-pose, eyebrows, lids, gaze (i.e., direction in which one or more eye or iris is facing), nose and mouth-contour of a user, respectively, wherein here also said sub-tasks may be controlled by the signal Sg in conjunction with a validation process through the validation 53.

An exemplary embodiment of the signal delivery main module 6 (FIG. 1) includes a signal module 61 (FIG. 6) controlled by the sub-task of a static classification means 62 and a dynamic classification module 63 controlled by the signal Sg (FIG. 4) and based on hidden Markov models 64.

Figure 6:
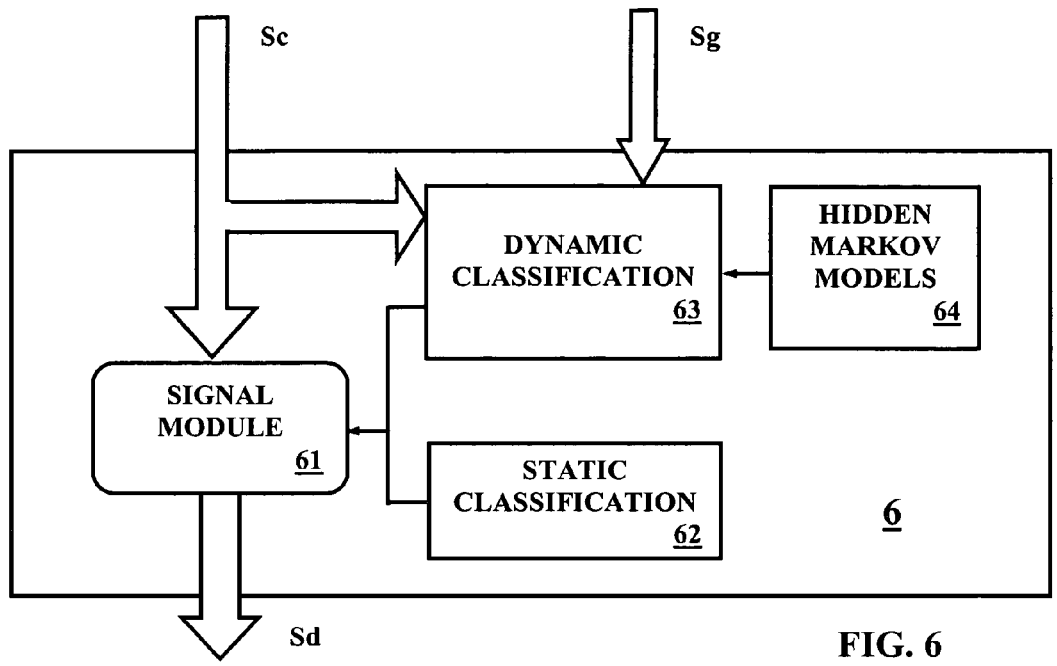
FIG. 6 shows an exemplary embodiment of a signal delivery main module.
Figure 7:
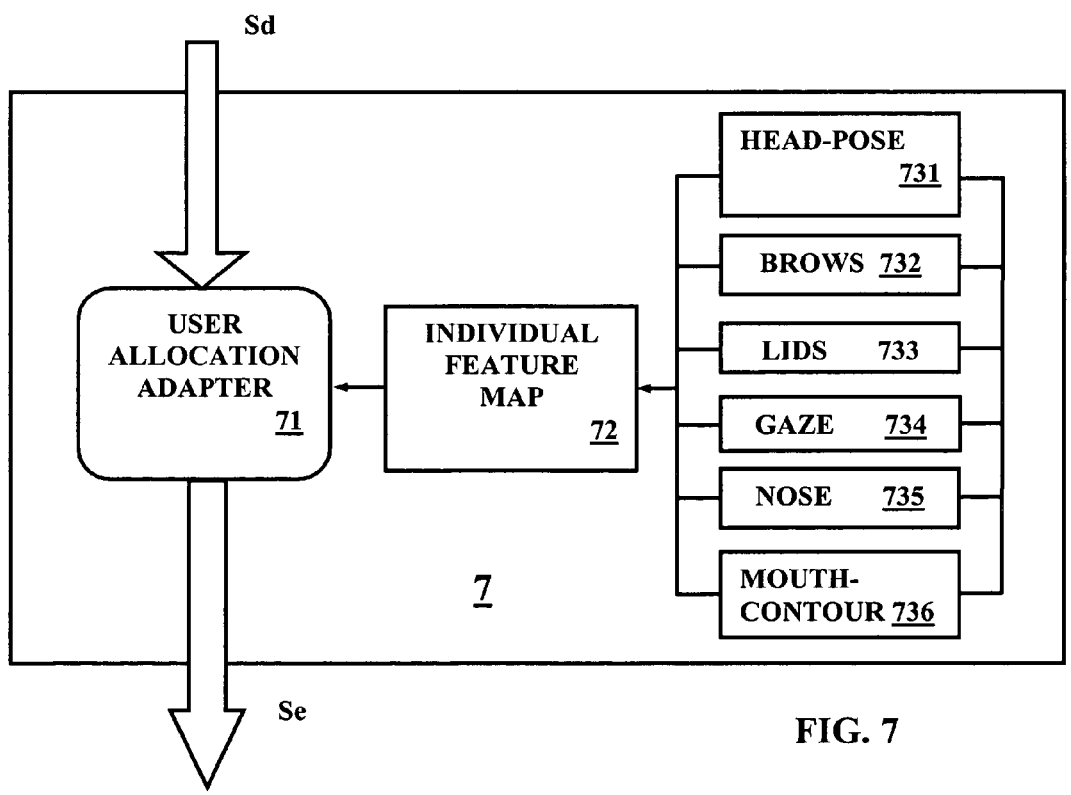
FIG. 7 shows an exemplary embodiment of a user adapted allocation main module.
Figure 8:
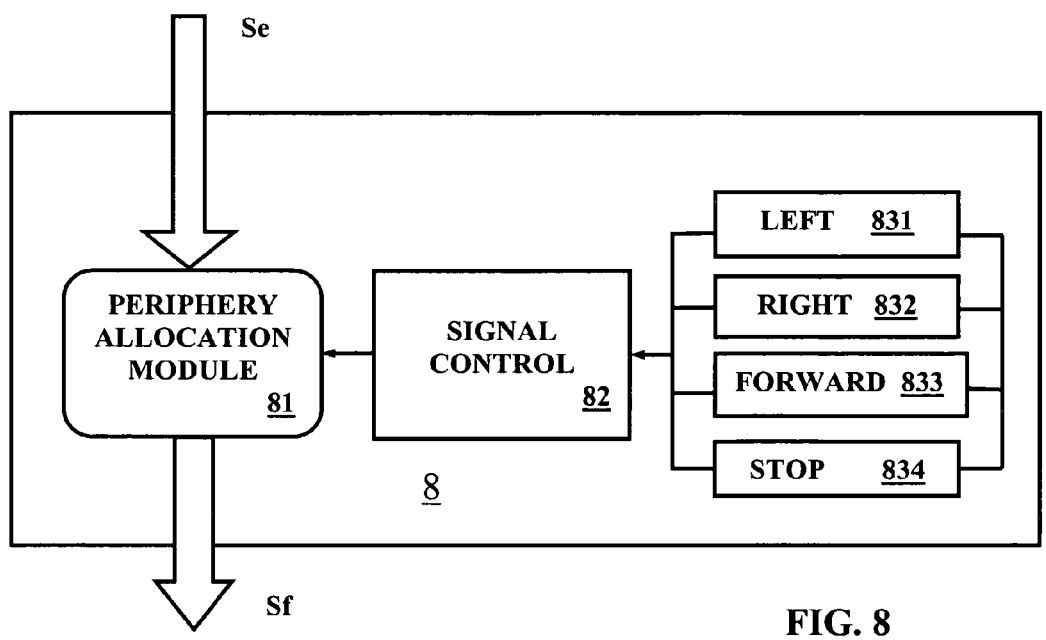
FIG. 8 shows an exemplary embodiment of a periphery allocation main module.

FIGS. 7 and 8 depict in more detail the tasks of an exemplary embodiment of the user adapted allocation main module 7 and an exemplary embodiment of the periphery allocation main module 8 of the system according to FIG. 1. The user adapted allocation main module 7 includes a user allocation adapter 71 (FIG. 7) connected to an individual feature map 72 in relation to at least one of sub-tasks 731, 732, 733, 734, 735 and 736 related to the head-pose, eyebrows, lids, gaze, nose and mouth-contour of the user, respectively. In FIGS. 6 and 7 the elements 62, 64 and 731-736 may be programmed or customized for a given application of the system.

An exemplary embodiment of the periphery allocation main module 8 comprises a periphery allocation module 81 (FIG. 8) in collaboration with a signal control 82 in relation with commands 831, 832, 833, 834 corresponding to four movement-commands: left, right, forward and stop, respectively.

The system according to the invention functions as follows:

The face localization main module 3 receives an image sequence Si originating from a camera 11, localizes a face of a user and determines its pose. The pose means how the head of said user is deviated from a frontal view. The knowledge of the position of the face allows a recursive calibration of the camera by means of the calibration process 13 (FIG. 2) so that the face region constantly has a specific color and brightness.

The images manipulated in this way have characteristic feature regions like the eye regions, the mouth region, etc. which are then determined in the feature localization main module 4 fitting a previous trained face graph to the face. The next steps occur in the subsequent feature extraction main module 5, where the individual features like movement of the eyebrows, eyes and mouth as well as the pose are determined in detail. Selected feature constellations are then definitively classified in the signal delivery main module 6 and assigned to fixedly defined signals. For example, blinking three times the eyelids means that a predetermined signal may be activated. In the user adapted allocation main module 7, an autonomous adaptation of the system to the user takes place, so that, for example, the execution time may be prolonged if a typical feature constellation remains for certain time. Finally, the signal may be transmitted to a periphery allocation main module 8, which transforms said signal to signals adapted for the execution module 9.

The face localization comprises the steps of calibrating the camera with regard to color and brightness to adaptively adjust a skin color model of the user and selecting a suitable model for the determination of the feature regions. The face localization module 31 finds the face by using a holistic face model 33 which has been stored in the system as an a-priori knowledge. In order to diminish the computing time, skin colored regions may be examined. This is accomplished by means of probability cards in the skincolor-model adapter 36 (FIG. 3) which initially uses common skin color histograms from the general skincolor model 37 which are accommodated to the skin color of the user according to the signal Sh (FIG. 3). If the face is not found in short time, the face tracking 32 follows the face with the help of an algorithm starting with the last valuable position. The shadow reduction 34 and the over-shining reduction 35 are provided to improve the quality of the image.

For the localization of the characteristic feature regions a face graph is used which works in conformity of the Active Appearance Models according to Cootes et. al. Reference: T. F. Cootes, Edwards G. J., Taylor C. J., Active Appearance Models, In: IEEE Transactions on Pattern Analysis and Machine Intelligence, vol. 23, issue 6, pp. 681-685, 2001, the contents of which are fully incorporated herein by reference.

These facial graphs use previously trained data material and knowledge about geometry and texture. If it is desired to take into account the individual image of different users or the changing aspects, as eyeglasses, beard, coiffure, etc., of the image of a single user, each of these individual images may be assimilated in a model through a training process. For that purpose, there are different possibilities. If many views of different users are trained in the system, the variability of the model increases, but the graph may no longer be able to find certain details of the user's face. Hence, this involves a diminution of the reliability. Alternatively, if different poses, face expressions, etc. of a single user are supplied to the training process, an increased reliability of the system may result. This technique is similar to that of speech recognition, wherein, for example, the user trains the system by reading a predetermined text so that the system can better assimilate certain phonemes.

Thus, the improved method according to the present invention uses a plurality of models specially adapted to an actual position of the user's head, in order to increase the reliability of the system. The models are produced through synthetically generated views. This advantageously facilitates the training of the system to a user and at the same time minimizes the variability of a single model. To that end, a virtual bio-mechanical 3-dimensional model of the user's head is generated from a single frontal view 45 (FIG. 4) together with a general face graph 46. This virtual model disposes anatomically placed muscles and man-simulated superficial tensions. This model allows simulation of different poses, face expressions and lighting which may be used in conjunction with the above described pose models. Finally, these models may be stored in the ancilary data bank 43.

The described process may be initiated in a first approach. It occurs during normal operation, unperceived by the user. Then, one of the models consistent with the pose may be selected in the adaptive face-graph module 42 and adapted to the user. This allows the characteristic face regions to be determined in the feature localization module 41.

Thus, according to the invention, the main modules 1, 2, 3, 4, 5 and 6 (FIG. 1) may be considered as a virtual filter bank, which accomplishes a video-based analysis of facial structures, like the pose of the head or the shape of the mouth. After the camera has been calibrated, an image sequence may be obtained and a computer may accomplish a face localization and then a feature localization, e.g. the shape of the mouth or the position of the iris or gaze.

Then, the computer delivers data signals according to a feature extraction in accordance with a mimic. The interpretation of human mimic is based on so called Action Units which represent the muscular activity in a face. To classify these units, local features, like eyes, eyebrows, mouth, lids, shadows and their spatial relation to each other, may be extracted from the images. An Active Appearance Model (AAM), which incorporates geometrical and textural information about a human head, may be used. Reference: M. B. Stegmann, "Active appearance models: Theory, extensions and cases," Master's thesis, Informatics and Mathematical Modeling, Technical University of Denmark, DTU, Richard Petersen Plads, Building 321, DK-2800 Kgs. Lyngby, August 2000, the contents of which are fully incorporated herein by reference.

The AAM is a statistical model derived from the Active Shape Model (ASM). Reference: Matthews, J. A. Bangham, R. Harvey, and S. Cox, "A comparison of active shape model and scale decomposition based features for visual speech recognition," in Computer Vision-ECCV'98, $5^{th}$ European Conference on Computer Vision, Freiburg, Germany, 1998, Proceedings, ser. Lecture Notes in Computer Science, H. Burkhardt and B. Neumann, Eds., vol. 2. Springer, June 1998, pp. 514-528, the contents of which are fully incorporated herein by reference.

Such a face graph can be applied to an artificial 3-dimensional (3D) head with an anatomically correct muscle model which makes it possible to generate different expressions by changing the parameters of the muscle model.

To accommodate different users, this generalized model may be readjusted. According to the invention, the textural information contained in the AMM may have a greater impact on successful recognition of the user's pose and mimic than the geometrical data since the surface textures of different faces contain more varieties.

In the ancillary data bank 43 (FIG. 4), for example, n=5×6=30 models, may be stored. But according to a "pose" of the head of the user "filtered" in the face localization main module 3, which furnishes the signal Sa to the ancillary data bank 43, only one of these n models is selected.

It is also convenient to add textures of a user's face into the model. This involves a training step, in which a frontal image of the user is taken and applied to the artificial 3D head. The model can now be used for generating different views under different lighting situations with several mimic expressions. These synthetic views are used to train the recognition system. During use, the system can now produce assumptions about the current head pose and the current mimic of the user. Specified mimics, like opening of the mouth, can be used to control an apparatus or a user interface. Several options are accessible through the interface: control of an alarm signal in a vehicle, regulation of speed for backward and forward movement, and/or adjustment of the backrest, the height of the seat and the footrest, and/or control of external devices like hi-fi systems or lighting, etc.

According to the invention, the main modules 7, 8 and 9 (FIG. 1) may be considered a virtual discriminator bank. The user adapted allocation main module 7 of this bank accomplishes the task of comparing the delivered features of a mimic position with a standard mimic position of the user or, in other words, to adapt the detected mimic position of the user to a stored typical mimic position of the user, e.g. corresponding to a desired command or robotic movement. On the other side, the periphery allocation main module 8 of the virtual discriminator bank accomplishes the task of comparing the delivered features of the periphery of the system with external objects in the periphery of the user which may be taken into account in correspondence to a desired application of the user.

For applications including manipulation tasks, a so called Assistive Robotic Manipulator (ARM) may be used. It has several degrees of freedom including the gripper jaws. A small camera capable of acquiring color images may be mounted on the gripper. While the ARM can be controlled through a joystick of the system, it is also connected to the computer modules which e.g. may be hidden in the box at the back of a vehicle. Two portable compact PC-modules, for example, are capable of handling the real-time image processing and planing system associated with the ARM. The graphical user interface, which may be used to control a vehicle, can be displayed, for example, on a standard flat screen touch-panel.

In consideration of its dimensions, features and weight, the ARM is suitable as a mobile manipulator. However, the gripper may have a positioning accuracy of about 2-3 cm. The deviation of the gripper camera from the assumed position may introduce calculation errors into the reconstruction process. The impact of these errors can be reduced by using the visual hull reconstruction method rather than feature matching approaches. Reference: G. Slabaugh, B. Culbertson, T. Malzbender, and R. Schafer, "A survey of methods for volumetric scene reconstruction from photographs," Volume Graphics, June 2001, the contents of which are fully incorporated herein by reference.

This method approximately acquires the bounding geometry, which is sufficient for the intent of the present invention. While the user can specify how the object may be picked up, the manipulation control system carries out a segmentation step, wherein to distinguish between an object of interest and the background, the image taken by the gripper may be segmented with an adaptation of the watershed segmentation algorithm. Reference: J. P. A. Moya, "Segmentation of color images for interactive 3d object retrieval," Ph.D. dissertation, RWTH Aachen University, 2004, the contents of which are fully incorporated herein by reference.

The filter bank is able to analyze and convert actual live mimic expressions to respective signal sequences. The discriminator bank compares said sequences with stored sequences corresponding to typical conventionally determined mimic expressions in order to switch command signals to the actuators, manipulators, etc. Since the user can make mistakes, change his/her intention, have a black-out or may be deceased, the system may include certain safety devices or virtual safety elements.

In an alternative embodiment, infrared or near-infrared may be used for facial feature extraction and analysis.

The system according to the invention is intended for a wheelchair, a patient bed or other appliances. The system may be combined with one or more manipulators. The system uses machine vision to assist persons with physical disabilities by performing navigation and manipulation tasks in response to mimics. This system provides the user with the means to move freely and interact with the environment through a simple interface. The disclosed invention may be implemented in many ways sharing common characteristics for wheelchairs equipped with at least one compact computer module, e.g. hidden in the back, at least one camera, and also provided with at least one manipulator and an optional touchscreen. It is also possible to have several, e.g. seven cameras. The robotic wheelchair system according to the invention includes an autonomous control for users. This is useful to impaired users whose body movement restrictions prohibit them from steering the wheelchair themselves. In one embodiment, a stereo-camera is mounted at the head restraint of the backrest of the wheelchair or appliance in order to enlarge the forward looking field of view. This camera provides means for distance-measurements during navigation and is also important for the autonomous control of manipulation tasks. Another camera may be looking backwards to assist the driver while backing up. A small camera focuses on the face of the driver to interpret his/her facial expression or mimic and his/her head pose. Suitable examples of wheelchairs, manipulators and robotic controls for wheelchairs are described in Bley, Rous, Canzler, and Kraiss, Supervised Navigation and Manipulation for Impaired Wheelchair Users, Proceedings of the IEEE International Conference on Systems, Man and Cybernetics. Impacts of Emerging Cybernetics and Human-Machine Systems, pp. 2790-2796, The Hague, IEEE Systems, Man & Cybernetics Society, Thissen, Wil/Wierings, Peter/Pantic, Maja/Ludema, Marcel (Eds.), the contents of which are fully incorporated herein by reference.

In one exemplary embodiment, the described system (FIG. 1) uses a Coarse-To-Fine approach (Coarse System-Course). This means the sequential processing estimates facial features more and more detailed from step to step: Scene/Face-Region/Feature-Regions/Features/Feature-Behavior/Control-Signal. A camera 11 acquires an image sequence 12 and sends this to the next main module (i.e., 3) by Signal Si. In the next step, a face-localization is performed by the face localization main module 3. The determined face-region includes forehead, brows, eyes, nose and mouth and is sent to the feature localization main module 4 by signal Sa. The face-region serves for the initialization of an approach to estimate, for example, 70 characteristic face-points. These points or so-called landmarks are evenly distributed on brows, eyes, nose, mouth and chin. To approximate these points on the image of the user, a pre-trained face-graph matching takes place in the feature localization main module 4. The estimated regions are provided to the next main module (i.e., 5) by Signal Sb.

The feature extraction main module 5 estimates the facial features in more detail. This primarily affects the position of the iris (gaze), the brows and the mouth-contour. Additional features like the position of the nostrils and the pose of the head are determined. Recapitulating the estimated features, the facial expression of the user is represented. The information is provided to the next main module (i.e., 6) by signal Sc.

The system may analyze the behavior of each single feature with reference to a lapse. For example, in the signal delivery main module 6, the features of a sequence of several images may be classified and the intensity of a changing expression could be interpreted. So, it is possible to distinguish between slowly and quickly performed head movements and to react differently based on this distinction. The motion-patterns of the features are provided to the next main module (i.e., 7) by signal Sd.

The user adapted allocation main module 7 serves to recognize an assortment of user-dependent behavior. For example, opening and closing of the lids are investigated in the following process. The signals used in conjunction with different user behaviours are defined before the system starts. The so filtered features are sent to the next main module (e.g., 8) by signal Se.

The periphery allocation main module 8 deals with the mapping of the motion-patterns to control-signals by analyzing the intensity of the feature. For example, small unintended movements may not categorically result in commands. Recapitulating in this module, the final control-signals Sf for the technical periphery are created. Finally, the execution module 9 serves as the practical execution of the signals to control technical periphery.

The camera calibration and image sequence main modules 1, 2 (FIG. 2) provide quality improvement of the input signal. The purpose of these main modules 1 and 2 is the optimization of certain parameters of the camera 11 for obtaining suitable images. Overexposure should be minimized and the distribution of intensity and white balance should be provided to be constant. Therefore, the calibration process 13 adjusts parallel white balance, gain and shutter settings of the camera to an optimal configuration. This is done by using an advanced Simplex-algorithm presented in NeMe65: Nelder J. A., Mead R., A Simplex Method for Function Minimization. In: Computer Journal, vol. 7, issue 4. pp 308-313, 1965, the contents of which are fully incorporated herein by reference, that varies the parameters until an optimized intensity and color distribution is obtained. This is done for the face-region assigned by signal Sa. Finally, the improved images are submitted as an image sequence 12 to the the next main module (i.e., 3).

The face localization main module 3 (FIG. 3) provides optimization of the camera settings with reference to white balance, intensity and shutter 12, adaptive adjustment of a skin-color model of the user 36 and initialization of the face graph-matching 41.

The face is localized within the face localization module 31 by using a holistic model 33, for example, such as the model presented in ViJo01: Viola P., Jones M., Rapid Object Detection using a Boosted Cascade of Simple Features. In: Computer Vision and Pattern Recognition Conference 2001, vol. 1, pp. 511-518, Kauai, Hawaii, 2001, the contents of which are fully incorporated herein by reference. This model contains a-priori knowledge with respect to the intensity distribution within a face. Eyebrows, for example, are typically dark regions in upper left and right placement, which is framed by light regions. In addition to the general holistic face-model 33, the final holistic model is trained by synthetic generated views of the user (Signal Sg).

To shorten the calculation time, the skin-colored regions may be analyzed 36. Therefore, the probability of each image point is determined, whether it belongs to the skin class or the background class. This may be performed using an approach with using two histograms and the bayes-theorem as described in JoRe98: Jones M. J., Rehg J. M., Statistical Color Models with Applications to Skin Detection, Technical Report CRL 98/11, Compaq Cambridge Research Lab, December 1998], the contents of which are fully incorporated herein by reference.

In another embodiment, the system may be adapted dynamically to the user. A-priori knowledge relating to the skin color of the face region may flow into the system recursively through the actual view Signal Sh. If the face is lost, another algorithm, face-tracking 32, may track the face, starting from the last valid position. This approach may be similar to the Lukas-Kanade tracker presented in ToKa91: Tomasi C., Kanade T., Detection and Tracking of Point Features, Technical Report CMU-CS-91-132, 1991, the contents of which are fully incorporated herein by reference.

To enhance the quality of the image for sequent modules, a correction of under-exposure and overexposure takes place through shadow reduction 34 and overshining-reduction 35. Dark skin colored regions may be lightened and bright regions may be reconstructed by mirroring symmetrical areas. The position of the face regions may be used for the initialization of the face graph-matching by the feature localization module 41 and to adapt the camera settings associated with the calibration process 13 via Signal Sa.

The feature localization main module 4 (FIG. 4) provides several regions for detailed feature evaluation by the feature extraction module 51 and creation of a database in the ancilary data bank 43 which contains a-priori knowledge for the system.

Notably, the use of synthetic generated views gives the system a-priori knowledge. Principally, the complete system is a complex imaging process for scene analysis. As used herein, the scene includes the upper body region of a user, the analysis affects and the facial features, but is not limited thereto. Thus, in one embodiment, the solution of this task may include Al (Artificial Intelligence). The Al may provide the computer with a-priori knowledge defining certain human mimics and how such mimics work. Therefore, the system may be given a multitude of examples. To pay attention to individual characteristics of the user (beard, glasses, face geometry, appearance) and furthermore to consider extrinsic factors (lighting conditions, camera distortion), the system may use a virtual head model of the user.

For the localization of characteristic feature regions, a face graph is introduced in the adaptive face-graph 42 that is, for example, based on Active Appearance Models presented by CoTa01: Cootes T. F., Taylor C. J. Statistical Models of Appearance for Computer Vision, Wolfson image Analysis Unit, Imaging Science and Biomedical Engineering, University of Manchester, Manchester M13 9PT, U.K., October 2001, the contents of which are fully incorporated herein by reference. The face graph, for example, consists of 70 important points in the face, placed on brows, eyes, nose, mouth and chin. Furthermore the texture is stored, given by the triangulation of the used points.

The face graph applies pre-trained data and knowledge of geometry and texture. Many examples may be incorporated by multiple camera views of the user during the training process.

Several approaches exist to solve this task. The more views of different users that are trained into a system, the more the variance of a model may increase. However, when the variance is more, the generated face graph may not match the user's face features robustly.

Alternatively, it is possible to let the user perform a variety of different head-poses and/or facial expressions under changing lighting conditions in a separate training step. This is state of the art in speech recognition systems, for example, where a user trains the system by reading given text examples.

The here used innovative approach utilizes for increasing the robustness of the recognition performance a big variety of models for each head-pose. The models are stored in a database 43. Which model afterwards is used for the graph-matching 42 depends on Signal Sj that represents the actual performed head-pose.

It is preferable to reduce the training expenses for the user to a minimum and to minimize the variance within the several models. For this task the presented approach uses synthetic generated views. Therefore in the beginning a single frontal view of the user 45 is combined with a graph-matching basing on a general database 43. The result is a bio-mechanical 3d-head-model of the user 44. This virtual model incorporates anatomically correct placed muscles and simulation of the skin behavior. With this model it is possible to produce different head-poses, facial expression and lighting conditions synthetically.

The creation process of the 3d-head-model comprises in deforming a given standard 3d-head-model 44. Therefore, 70 characteristic points are matched on one single frontal view 45 with a graph-matching explained before 46. Because of the unavailable depth-information this may not be changed, but this means some information may be lost. Also, the texture is transferred to the 3d-head-model. Alternatively it is thinkable to scan the users head with a 3d-laser-scanner to obtain a detailed model of his/her head. During the following process, changing of the textures (beard, glasses) may be trained into the models in a separate background process.

For example, thousands of synthetic generated views (Sg) provide for better matching by the adaptive face-graph 42, an improved localization by the face-localization module 31, a more accurate determination of the face features by the feature extraction module 51 and a robust analysis of the behavior of the single features by the dynamic classification 63.

The signal delivery main module 6 (FIG. 5) provides estimation of reference points (for example, nostrils), estimation of mutable features (for example, brows, eyes, mouth-contour) and estimation of the head-pose.

By using, for example, 70 characteristic points, which are estimated by the feature localization module 41, it is possible to investigate the single features in more detail. This affects the brows, the eyes, the nostrils, the mouth-contour and the head-pose. To estimate the position of the brows 522 the system investigates the brow-region by applying, for example, the so called Colored-Watershed-Transformation ViSo91: Vincent L., Soille P., Watersheds in Digital Spaces: An Efficient Algorithm Based on Immersion Simulations. In: IEEE Transactions on Pattern Analysis and Machine Intelligence, vol. 13, no. 6, pp. 583-598, 1991, the contents of which are fully incorporated herein by reference. Additionally, the Y-gradient is used to localize the edges from dark to light areas. This corresponds to the upper edge of the brows. If this approach results in a discontinued polygon-line, the segments may be connected in an additional step. The iris is estimated within the eye-region in conjunction with the gaze 524 by using, for example, an advanced Circle-Hough-Transformation that is presented in Ho62: Hough P. V. C., Methods and Means for Recognizing Complex Patterns, U.S. Pat. No. 3,069,554, Dec. 18th, 1962, the contents of which are fully incorporated herein by reference. This provides localization of circular objects by accumulating the edges of the objects in a so called Hough-Space. This is a 3-dimensional space that is created by X,Y-position and the radius of possible circles. The maxima in the Hough-Space represent the center of the eyes. The nostrils, for example, are detected by searching significant dark areas within the lower nose-region in conjunction with the nose 525. They serve for the validation of the other features. For the localization of the mouth-contour 526, for example, a point distribution model is used in combination with an Active Shape Model. A similar approach, for example, is described in CoTaCo95: Cootes T. F., Tylor C. J., Cooper D. H., Graham J., Active Shape Models-Training and Application. In: Computer Vision and Image Understanding, vol. 61, no. 1, pp. 38-59, 1995, the contents of which are fully incorporated herein by reference. Here, the mouth-contour is modeled, for example, by 44 points which are evenly distributed on the upper- and lower lip.

For the initialization of the ASM, the mouth-contour may be roughly approximated. Therefore, four feature maps may be calculated to emphasize the mouth-contour against the skin by its color and gradient. The feature maps could be combined to a single map that afterwards is freed from noise. For example, eight (8) points on the contour may be extracted and reconnected by a spline-interpolation. The resulting polygon serves as an approximation for the ASM-initialization. Finally, the ASM is adapted by using the resulting image that contains the edges (for example, resulting from SUSAN or Canny-Algorithm).

For the analysis of the head-pose 521, two approaches may be combined. The first approach, for example, deals with an analytic processing step that pulls the geometry of a trapeze given by eyes and mouth-corners together with the pose. These four points are provided by the previously estimated face-graph. This approach is similar to procedures presented in MuZiBr95: Mukherjee D., Zisserman A., Brady J., Shape from Symmetry-Detecting and Exploiting Symmetry in Affine Images. In: Philosophical Transactions of Royal Society of London, Series A (351), pp. 77-106, 1995, the contents of which are fully incorporated herein by reference. The second approach also uses the face-graph. First, the convex hull of the points are extracted. Next, the points lying within the hull are transformed in an Eigen-Space whose base is given by a principal component analysis of, for example, 60 synthetically generated reference-views. Calculation of the minimal Euclidian Distance of the transformed views to the reference points in the Eigen-Space results in the estimation of the head-pose. More details to this approach are given in KeGoCo96: McKenna S., Gong S.; Collins J. J., Face Tracking and Pose Representation. In: British Machine Vision Conference, Edinburgh, Scotland, September, vol. 2, pp. 755-764, 1996, the contents of which are fully incorporated herein by reference. Finally, a comparison of the results of the analytic and holistic approaches takes place to validate both processes. In case of differences, another estimation is made by predicting the actual head-pose based on the last estimation and the optical flow of the, for example, 70 points. The determined head-pose flows into the system recursively by signal Sj to choose the correct adaptive face-graph 42 in the next system-cycle. The evaluated features are validated by their constellation in the validation 53 using the synthetic generated views given by signal Sg.

The signal delivery main module 6 (FIG. 6), for example, determines the motion pattern of the several features. To investigate the temporal motion pattern and the behavior of the features, several sequential images are analyzed. Therefore, two approaches may take place in parallel: first, on each image a classification of static features may be done by using Fuzzy-Sets in conjunction with the static classification 62 and secondly, the lapse may be estimated by using Hidden Markov Models (HMM) 64 in the bakis topology in conjunction with the dynamic classification 63. This stochastic approach is often used in the context of speech-recognition and is described in LaRaBi93: Lawrence R., Rabiner, Biing-Hwang J., Fundamentals of Speech Recognition, Prentice Hall Signal Processing Series, 1993, the contents of which are fully incorporated herein by reference. HMMs are well suited to model the transition between different face-expressions. They are also trained by synthetically generated views in conjunction with the ancilary data bank 43.

The user adapted allocation main module 7 (FIG. 7) allocates temporal motion patterns to control-signals. The user adapted allocation main module 7 provides for the selection of user-specific motion patterns caused by performing facial-expressions. After the localization of the features by the feature extraction main module 5 and the estimation of their behavior by signal delivery main module 6, the user adapted allocation main module 7 filters signal Sd based on the individual feature map 72 and relevant signals depending on the abilities and wishes of the user. The individual feature-map 72 may be defined before using the system.

The above mentioned exemplary embodiments are merely understood to be a representation of the employment of such a system. Other embodiments resulting therefrom for one skilled in the art, however, also contain the basic concept of the invention. For example, the extracted features may also be used for observing illness or the life state of the user, such as, for example, recognition of tiredness, spasms and/or deceased conditions.

The invention claimed is:

1. A computer readable medium for encoding computer modules for a facial feature analysis, the computer modules communicating with at least one compact computer module and one camera and further including:
   a face localization main module for calculating a face localization of the user by using a face localization module based on the parameters of at least one of a holistic face-model and a face-tracking means;
   a face feature localization main module for calculating a feature localization by using a feature localization module and an adaptive face-graph means connected to an ancillary data bank for selecting a biomechanical model in dependence of a signal Sa delivered by said face localization main module;
   a feature extraction main module for calculating a feature-extraction by using a feature extraction module and stored feature values selected via a validation controlled by a signal Sg delivered by said ancillary data bank; and
   a signal delivery main module for calculating output signals for a desired application.

2. The computer readable medium in accordance with claim 1, wherein said signal Sg delivered by the ancillary data bank is also fed to said face localization module of said face localization main module.

3. The computer readable medium in accordance with claim 1, further comprising in said face localization main module at least one of a shadow-reduction means and an over-shining reduction means connected to said face localization module.

4. The computer readable medium in accordance with claim 1, further comprising in said face localization main module a skincolor model adapter connected to said face localization module in accordance with a general skincolor model.

5. The computer readable medium in accordance with claim 1, further comprising in said feature localization main module at least one of a general face-graph and a frontal view connected to said biomechanical model.

6. The computer readable medium in accordance with claim 1, further comprising in said feature extraction main module means for storing signal values corresponding to at least one of a head-pose feature, an eyebrows feature, an eyelids feature, a gaze feature, a nose feature and a mouth-contour feature, wherein the at least one feature is selectably validated by the validation via said signal Sg.

7. The computer readable medium in accordance with claim 1, further comprising in said signal delivery main module a signal module connected to a static classification means.

8. The computer readable medium in accordance with claim 7, further comprising in said signal delivery main module a dynamic classification means connected to said signal module, wherein said dynamic classification means is controlled by said signal Sg to selectively include hidden Markov models.

9. The computer readable medium in accordance with claim 1, further comprising a user adapted allocation main module means for calculating a user adapted allocation by using a user allocation adapter and an individual feature map in accordance with general face features of the user.

10. The computer readable medium in accordance with claim 1, further comprising in said periphery allocation main module a periphery allocation module connected to a signal control for calculating a periphery allocation in accordance with at least one command modus and calculating therefrom execution signals.

11. The computer readable medium in accordance with claim 6, wherein said means for storing signal values generates a signal Sj for said adaptive face graph.

12. The computer readable medium in accordance with claim 9, further comprising in said user adapted allocation main module stored feature values corresponding to at least one of a head-pose feature, an eyebrows feature, an eyelids feature, a gaze feature, a nose feature and a mouth-contour feature.

13. The computer readable medium in accordance with claim 10, further comprising in said periphery allocation main module stored command values corresponding to at least one of a left command, a right command, a forward command and a stop command.

14. The computer readable medium in accordance with claim 1, further comprising in said feature extraction main module means for storing signal values corresponding to a head-pose feature, an eyebrows feature, an eyelids feature, a gaze feature, a nose feature and a mouth-contour feature, wherein each feature is selectably validated by the validation via said signal Sg.

15. The computer readable medium in accordance with claim 1, wherein the feature-extraction is calculated at least in part using an Active Appearance Model.

16. The computer readable medium in accordance with claim 1, wherein the feature-extraction is calculated at least in part using a visual hull reconstruction method.

17. The computer readable medium in accordance with claim 1, wherein the feature-extraction is calculated at least in part using a segmentation algorithm.

18. The computer readable medium in accordance with claim 1, wherein the feature-extraction is calculated at least in part using at least one of an Active Appearance Model and a statistical model derived from an Active Shape Model, using a visual hull reconstruction method, and
using a segmentation algorithm.

19. The computer readable medium in accordance with claim 1, wherein the system provides a person-adaptive feature analysis in real-time.

20. The computer readable medium in accordance with claim 1, including means for control of wheelchairs, patient beds, or other appliances for users with physical disabilities, including supervised manipulation and navigation for impaired users of such systems.

21. The computer readable medium in accordance with claim 1, wherein the system is for all industrial, domestic, psychological and medical uses with exception of said uses related to wheelchairs, patient beds or other appliances for users with physical disabilities, including supervised manipulation and navigation for impaired users of such systems.

* * * * *